United States Patent [19]

Pascouet

[11] Patent Number: 4,976,333
[45] Date of Patent: Dec. 11, 1990

[54] METHOD FOR RESHAPING ACOUSTICAL PRESSURE PULSES

[76] Inventor: Adrien P. Pascouet, 8925 Lipan, Houston, Tex. 77063

[21] Appl. No.: 352,975

[22] Filed: May 17, 1989

Related U.S. Application Data

[63] Continuation-in-part of Ser. No. 162,743, Mar. 1, 1988, Pat. No. 4,921,068.

[51] Int. Cl.$^5$ ............................................. G01V 1/04
[52] U.S. Cl. ................................. 181/115; 181/120; 367/144
[58] Field of Search .................... 367/142, 144, 15; 181/110, 118, 120, 115

[56] References Cited

U.S. PATENT DOCUMENTS

| | | | |
|---|---|---|---|
| 3,371,740 | 3/1968 | Loper | 181/115 |
| 3,454,127 | 7/1969 | Malme et al. | 181/115 |
| 3,601,216 | 8/1971 | Mott-Smith | 181/115 |
| 3,653,460 | 4/1972 | Chelminski | 181/120 |
| 3,744,018 | 7/1973 | Wood | 181/115 |
| 3,746,123 | 7/1973 | Huffhines | 181/115 |
| 3,804,194 | 4/1974 | Umphenour et al. | 181/115 |
| 4,735,281 | 4/1988 | Pascouet | 181/115 |

Primary Examiner—Charles T. Jordan
Assistant Examiner—J. Woodrow Eldred
Attorney, Agent, or Firm—Arnold, White & Durkee

[57] ABSTRACT

The present invention is directed to a method of modifying or reshaping the acoustical signature created by the explosive, underwater release of a highly pressurized gas. More specifically, the present invention is directed at a method for modifying the asymmetric and cuspate nature of the acoustical signature derivative from the generation of a primary pulse so as to allow for the beneficial superimposition of a second wavelet of opposite phase.

10 Claims, 10 Drawing Sheets

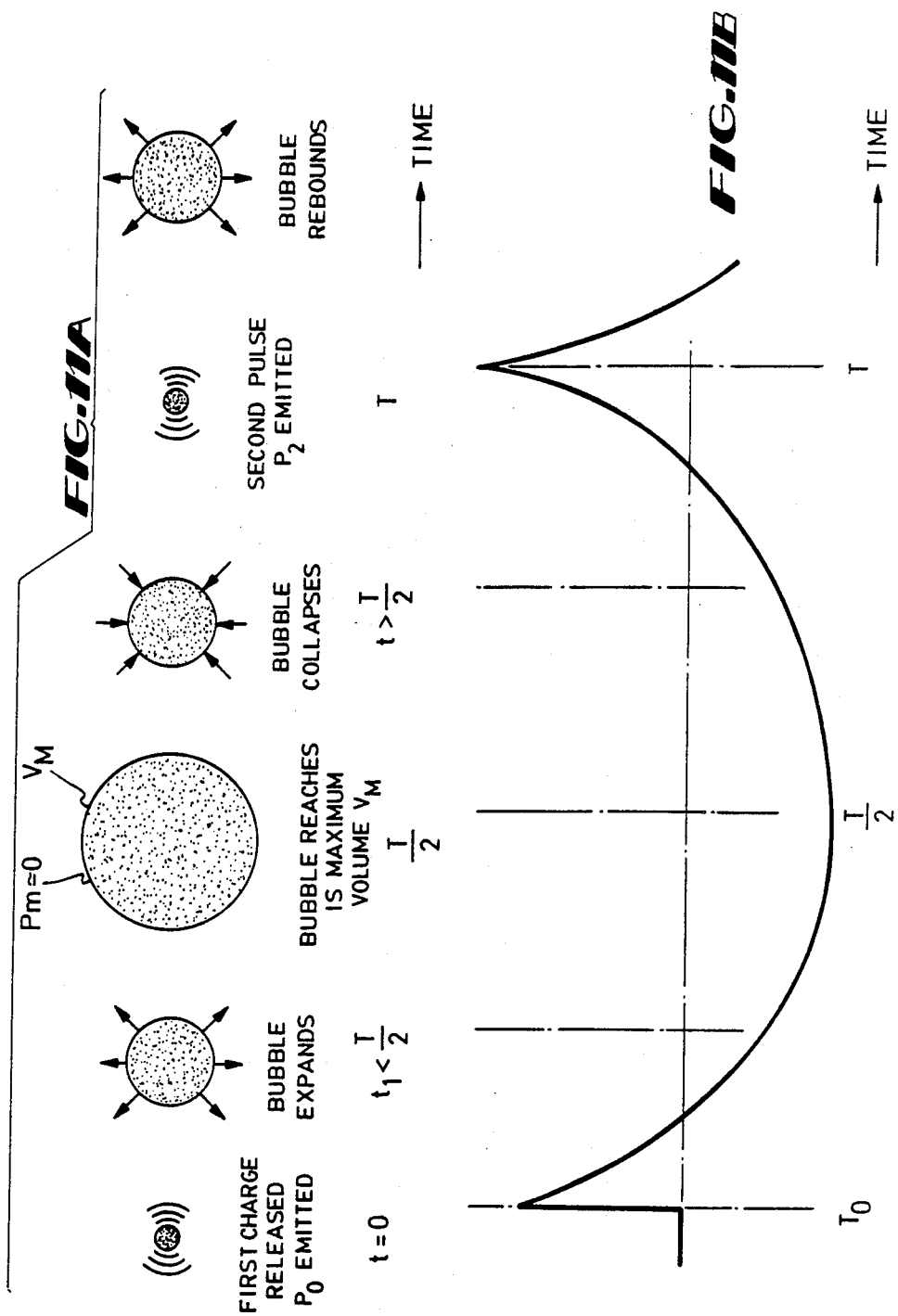

METHOD FOR RESHAPING ACOUSTICAL PRESSURE PULSES

CROSS-REFERENCE TO RELATED APPLICATIONS

This application is a continuation-in-part of Applicant's copending application Ser. No. 162,743 filed Mar. 1, 1988 now U.S. Pat. No. 4,921,068. The disclosure of this application, along with the disclosure of patent application U.S. Pat. No. 4,735,821, is herein incorporated by reference.

BACKGROUND OF THE INVENTION

1. Field of the Invention

The present invention is directed to a method of modifying or reshaping the acoustical signature created by the explosive, underwater release of a highly pressurized gas. More specifically, the present invention is directed at a method for modifying the asymmetric and cuspate nature of the acoustical signature derivative from the generation of a primary pulse so as to allow for the beneficial superimposition of a second wavelet of opposite phase.

2. Background

When a charge of highly pressurized gas is explosively released underwater, a powerful and useful primary pressure pulse is created, said pulse being followed by a pulsating tail with several secondary pressure pulses. These secondary pulses constitute a pulsating tail which is generally cuspate in shape. The asymmetrical nature of this signature tail generally complicates the reduction of its amplitude to an acceptable level for purposes of seismic exploration.

Methods have previously been developed to address the reduction or suppression of this asymmetrical secondary pressure pulse. In U.S. Pat. No. 4,735,821, ("the '821 patent") techniques are set forth for substantially eliminating the emission of the pulsating tail. This reduction is accomplished by tuning the selective injection of a second charge of highly pressured gas within the bubble created by the release of the primary charge.

Alternatives to this method, however, are desirable in a variety of circumstances. For example, it may sometimes be desirable to shape the overall acoustic signature on a shot-by-shot basis. Further, it may be desirable to suppress the spectrum oscillation of the signature, phase modulate, or invert the signature on a shot-to-shot basis to achieve a more stable $P_2/P_0$ ratio. Alteration of the method described in the '821 patent may also be desirable from the standpoint of beam steering the acoustic wave.

Incentives to vary from the teaching of the '821 patent also include the possibility of using a minimum number of identical acoustic generators in an array. Not insignificantly, it may also be desirable to deviate from the above described methodology for purposes of energy conservation.

SUMMARY OF THE INVENTION

The present invention addresses the above-noted and other needs for alternative techniques to achieve a complete or substantial bubble suppression.

The present invention is generally directed to a method for reshaping the acoustical signature derived from the explosive underwater release of a high pressure gas. Utilization of the present method allows for the selective adjustment of the acoustic wave signature.

The methodology of the present invention provides for the radiation of a modified oscillating tail created by the underwater explosive release of gas. Modification of the character of the oscillating tail is partially accomplished by changing the cuspate pulsating tail normally exhibiting an asymmetrical shape into a tail exhibiting a quasi-harmonic oscillation. This is generally accomplished by a partial and/or "detuned" injection of gas into the bubble. This modification can be completed by the utilization of a second wavelet having the same or substantially similar characteristics as the primary wave, but being of substantially opposite phase. In such a fashion, the now quasi-harmonic oscillating tail is reduced or substantially suppressed by destructive interference.

The present invention has a number of advantages over the prior art. One such advantage is the ability of the claimed method to reduce the energy needed for the creation of an acceptable $P_2/P_0$ ratio at a level below the minimum energy needed for acceptable bubble suppression in accordance with previously disclosed techniques.

A second advantage of the present invention is the ability to compensate for the partial failure of a gun component of an acoustic array without the need to suspend the operation of the array.

A third advantage of the present invention is the ability to further reduce the bubble to primary ratio by superimposition of several acoustic signatures, thereby allowing for an overall enhancement of the acoustic signature.

BRIEF DESCRIPTION OF THE DRAWINGS

FIG. 3'B is a diagram illustrating a quasi-harmonic far field signature.

FIG. 8A illustrates the acoustic signature formed as a result of a shorter than optimum delay in air injection into the bubble.

FIG. 8B illustrates the acoustic signature formed as a result of a greater than optimum delay in injection.

FIGS. 11A-B illustrate the oscillation pulses of the explosive underwater release of a gas charge in comparison with its accompanying signature.

DETAILED DESCRIPTION OF PREFERRED EMBODIMENT

The present invention may be generally described as a method for reshaping the acoustical signature and accompanying spectrum of the wavelet derivative from the explosive underwater release of a gas charge. The invention may also be described as a method to adjust the signature of this pressure pulse to accommodate specific and desired field applications.

A. Theoretical Basis

When a charge of highly pressurized gas is explosively released underwater, the explosive release produces a powerful and useful primary pulse and a pulsating "tail" which comprises several secondary pressure pulses. This "tail" can be defined as a wavelet emitted after the first expansion of the bubble.

Figure 1:
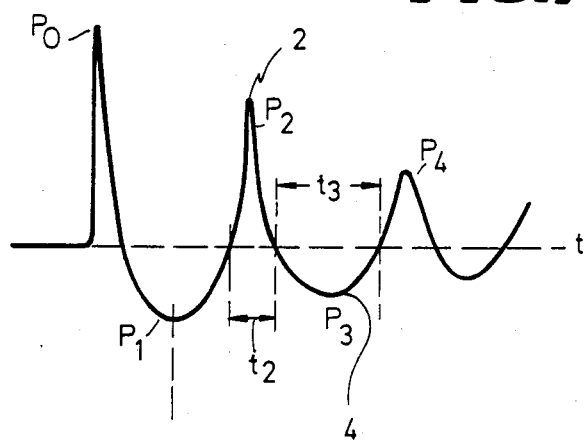
FIG. 1 is a diagram illustrating the cuspate and asymmetrical nature of the tail characteristic of an air gun signature.

As represented in FIG. 1, the pulsating tail that follows the primary pressure pulse $P_0$ in an air gun signature is generally characterized by the formation of cuspate, high amplitude peaks, 2 and round, lower amplitude negative arches 4.

An air gun signature is generally asymmetric in both shape and amplitude. When suppression is attempted by means of superimposition, the cuspate character of the positive peaks requires the utilization of greater than two pulsating wavelets in order to achieve an acceptable level of suppression. In this connection, six pulsating wavelets are typically employed to achieve an acceptable suppression.

The cuspate character of the positive peaks is largely responsible for the difficulty in suppressing or reducing the pulsations to an acceptable level by destructive interference. Restated, the cuspate nature of the positive pulse renders it impossible to acceptably reduce the amplitude of the secondary pulse by interference with the same wavelet of opposite polarity.

Figure 10:
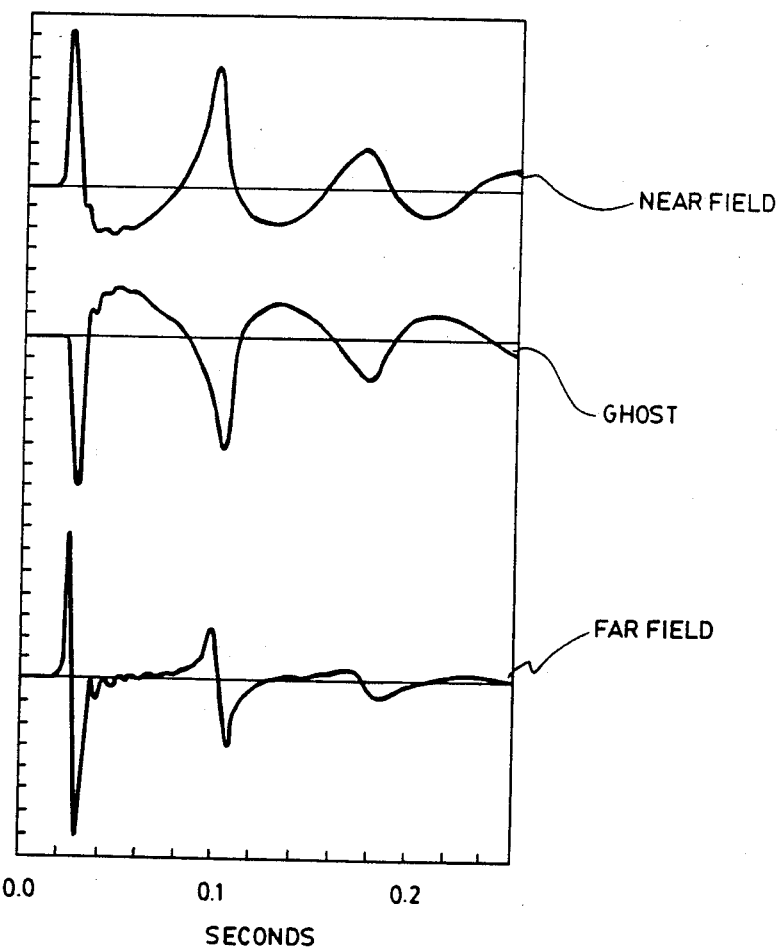
FIGS. 10A-C diagrammatically illustrates the superimposition of a cuspate wave signature with its own ghost.

The difficulty encountered in bubble suppression of a cuspate wave signature by means of superimposition is demonstrated in FIGS. 10A-C. FIG. 10A illustrates a first wavelet bearing a cuspate signature characteristic of the explosive underwater release of a gas charge by an air gun. FIG. 10B illustrates a second wavelet of opposite phase and polarity which has been selectively delayed. FIG. 10C represents the superimposition of the wavelets of FIGS. 10A and 10B. As illustrated at 10C, the superimposition of signatures having positive peaks of a cuspate shape renders it practically impossible to reduce, by acceptable standards, the pulsating tail utilizing interference with a wave of opposite phase and polarity.

Figure 2:
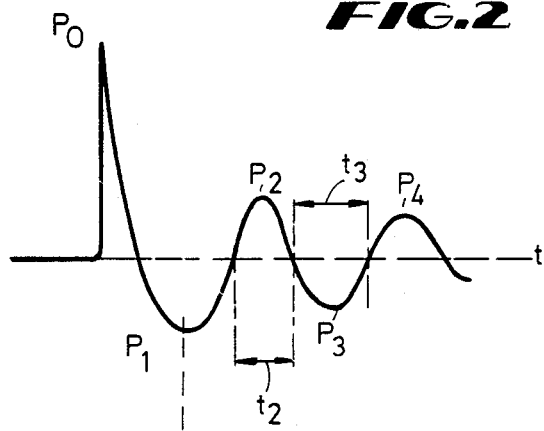
FIG. 2 is a diagram illustrating an exemplary quasi-harmonic waveform where both the pulsations and oscillations are dampened.
Figure 3A:
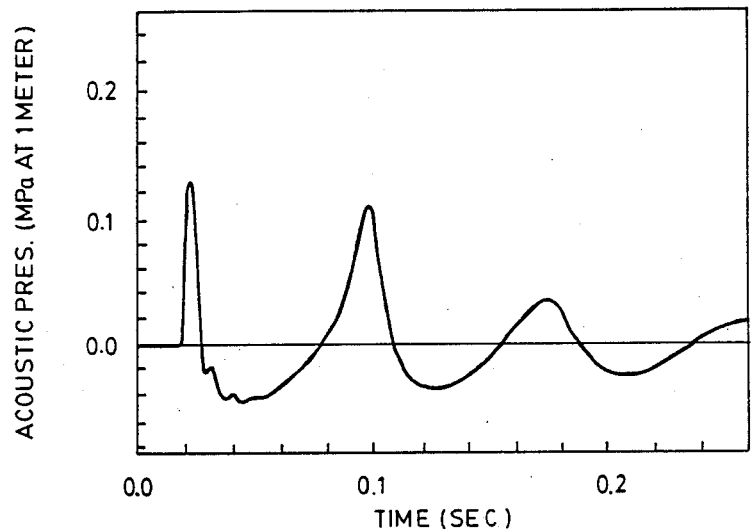
FIG. 3A is a diagram of a cuspate and asymmetrical near field signature.
Figure 3B:
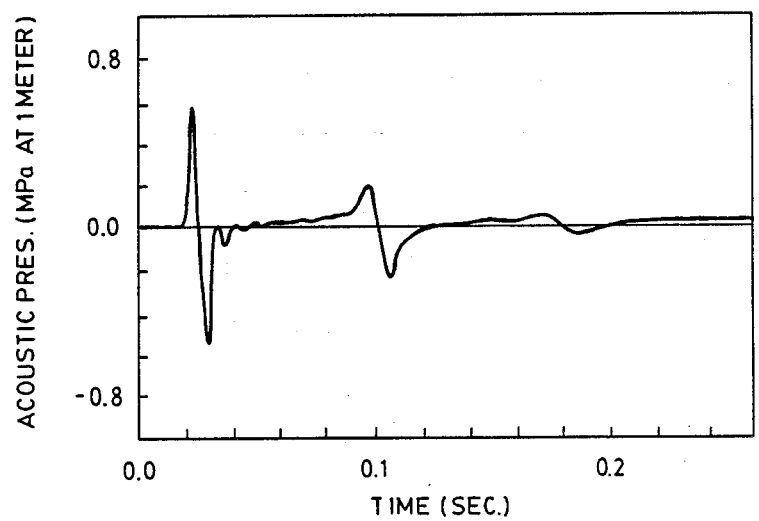
FIG. 3B is a diagram of a far field signature.
Figure 3C:
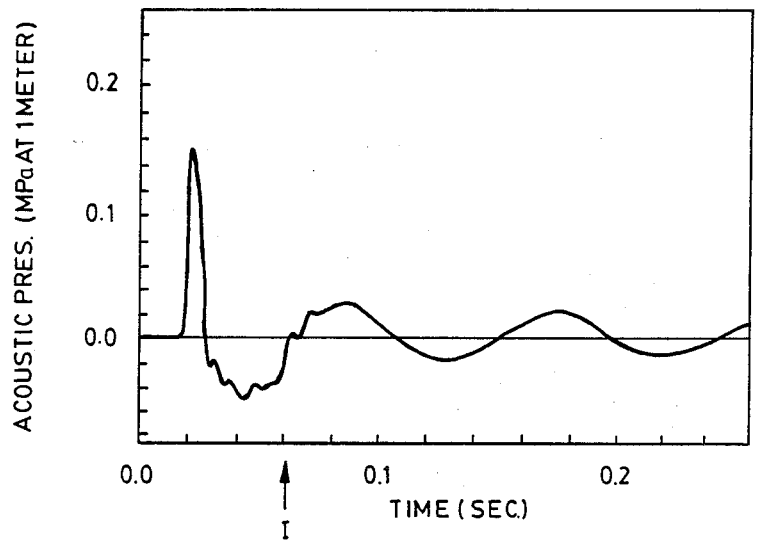
FIG. 3'A is a diagram illustrating a quasi-harmonic near field signature.
Figure 3D:
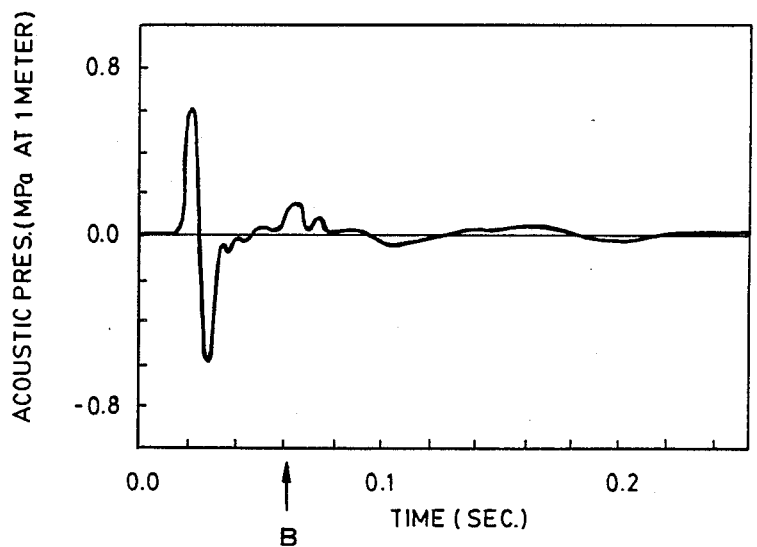

Suppression or reduction of the tail may be more easily accomplished, however, if the pulsatory, cuspate tail can be "reshaped" to closely resemble a dampened quasi-harmonic oscillation as illustrated at FIG. 2. The superimposition of a second signal having a quasi-harmonic tail of the same period and amplitude but of almost opposite phase will be sufficient, for example, to cancel out or reduce the oscillatory tail, while constructively interfering with the amplitude of the primary pulse. In such a fashion, the amplitude of the primary pulse may be enhanced while the secondary pulses are minimized.

Similarly, the "ghost" of the original tail may be used to reduce the amplitude of the resulting oscillations provided that the delay between the original wave and its "ghost" are adjusted in such a way as to result in destructive interference. Such an adjustment can be accomplished, for example, through adjustment of the underwater depth of the source.

EXAMPLE 1

FIG. 3'A illustrates an exemplary use of "ghost tuning" in a near field signature produced by a source and an injection having the following parameters:

$$V_a = 45 \text{ in}^3 \quad P_a = 2000 \text{ psi}$$

$$V_b = 85 \text{ in}^3 \quad P_b = 2000 \text{ psi}$$

In the above example, the ratio $E_b/E_a = 1.88$ or 24% below the theoretical minimum $E_b/E_a = 2.5$ for air. For purposes of the experiment illustrated at FIG. 3'A, the firing depth was maintained a D=4.5m=15 ft.

The bubble to primary ratio $(P_2/P_0)$ has been found to obtain a minimum value for an injection time of $t_m = 32.5$ msec. The results illustrated in FIG. 3'A, however, were obtained using an injection time of $t = 38$ msec. This injection time is longer than the optimum time of injection (32.5 msec). The resulting signature exhibits a quasi-harmonic shape having a $P_2/P_0$ ratio of 18% and a period $T' = 86$ msec.

A $P_2/P_0$ ratio of 18% is commonly unacceptable for use in seismic exploration. However, when the "ghost", or that part of the original wavelet that has been reflected by the free surface, is added to the wavelet signature as illustrated at FIG. 3'A, a "far field" signature is created such as illustrated in FIG. 3'B. As illustrated, the oscillating tail has been reduced with a corresponding reduction in the $P_2/P_0$ ratio from 18% to 5%. This reduction in the $P_2/P_0$ ratio has been brought about as a result of the destructive interference between the signature tails of the original wavelet and its corresponding ghost.

In order to enhance the amplitude of the original wavelet, the ghost wavelet is delayed prior to superimposition by 2D/C from the original wavelet. As illustrated in FIG. 3'B, the ratio 2D/C=6 msec (where C=the speed of the sound in water=1500m/sec). This delay or shift between the primary and the ghost wavelets is approximately seven percent (7%) of the period.

Reduction in the $P_2/P_0$ ratio may be achieved by adjusting or "tuning" the depth where the charges of gas are released to the period of the wavelets. For example, if an original oscillating tail has an amplitude A and a period T' when generated at a depth D, interference with its own ghost wavelet results in a tail with an amplitude A', and a resultant attenuation A'/A. In most practical instances found in the seismic industry, the attenuation A'/A can be approximated by the formula $$A'/A = 0.008 \, D/T \quad \begin{array}{l} D \text{ in Meters} \\ T \text{ in Seconds} \end{array}$$

As may be seen by reference to this relationship, the ratio D/T decreases rapidly when the firing depth is reduced. Also, when the ghost is added to the original signature, the amplitude (peak-to-peak) of the useful primary pulse is increased for most of the commonly used firing depths, further improving the ratio $P_2/P_0$.

Tuning of the $P_2/P_0$ ratio can also be achieved by maintaining the firing depth D constant (and equal to a selected value) and increasing (or decreasing) T. In such a fashion, the value of the injected energy may be changed. As will be further discussed herein, the period T depends on the ratio $$\left(\frac{E_b}{E_a}\right)^{\frac{1}{3}}$$

Therefore, by increasing the ratio $E_b/E_a$, T will increase and consequently the ratio A'/A will decrease.

It has been found that the cuspate shape of the pulsating tail of an air gun signature is due to the large pressure difference between the initial pressure of the gas $P_a$ and the hydrostatic pressure $P_H$ at the depth at which the gas is released. Typically:

$P_a = 2000$ psi = 138 bar and at a depth where $D = 18$ ft $\cong$ 6m, and $P_H = 22.8$ psi = 1.6 bar $P_a/P_H = 86$.

Because of the large pressure difference between the internal gas pressure $P_a$ and hydrostatic pressure $P_H$ when the bubble reaches it maximum volume $V_m$, the gas pressure within the bubble $P_{min}$ is far below the hydrostatic pressure $P_H$. For the above example, $P_{min}/P_H = 0.055$ When the bubble collapses, the actual pressure within the bubble $P_a$ increases only very slowly until the pressure reaches the hydrostatic pressure value $P_H$ and the water acquires its maximum kinetic energy. After the internal pressure has reached the hydrostatic value, the pressure increases very rapidly, producing a "cusp" in the signature. The character of the phenomenon is illustrated at FIG. 11A with a corresponding signature represented at FIG. 11B.

By contrast, if the internal pressure of the gas is not overly large compared with the hydrostatic pressure, the explosive release of the gas would produce a quasi-harmonic wavelet. In this case, the positive amplitude is substantially equal to the negative amplitude since the internal pressure of the bubble fluctuates between $P_a$ and $P_{min}$ in a relationship where $P_a - P_H = P_H - P_{min}$ This relationship is representative of small, harmonic oscillations similar to the small oscillations experienced when a mass is suspended on a spring.

Figure 4:
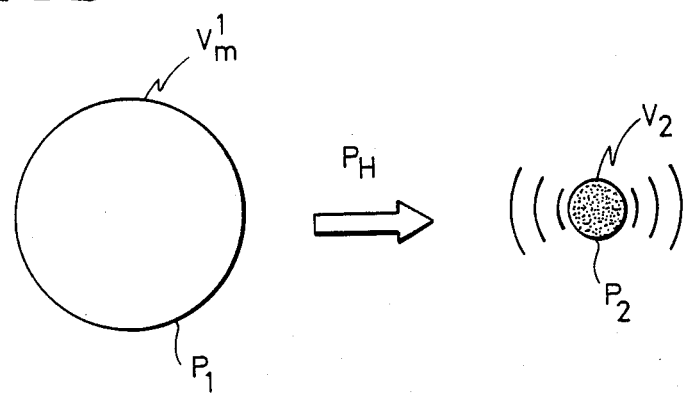
FIG. 4 is a schematic illustration of a bubble having a maximum volume $V'_m$ and a pressure $P_1$ after injection and immediately prior to the commencement of the implosion, and a minimum volume $V_2$ and pressure $P_2$ at the end of the implosion.

Both the shape and the amplitude of the secondary pressure pulse produced by the implosion of the bubble primarily depend on the internal pressure of the bubble at its maximum volume prior to the commencement of the implosion. FIG. 4 schematically illustrates a bubble having a maximum value $V'_m$ with an internal pressure $P_1$ immediately prior to the commencement of the implosion. At the conclusion of the implosion phase, the bubble has a volume $V_2$ and an internal pressure $P_2$.

For a given hydrostatic pressure $P_H$, the values of $P_1$ and $V'_m$ will depend on the history of the bubble as will $P_2$ and $V_2$. For example, if no injection is made into the original bubble, then the bubble will have a maximum volume equal to $V_m$ or the original maximum volume and $P_1$ will be equal to $P_m$, e.g. $P_m = P_1 = 0.055 \, P_H$. After the bubble has expanded to its maximum volume, a violent collapse will occur. When the bubble has achieved complete collapse and attains a minimum volume $V_2$, pressure $P_2$ will be in the order of $P_2 = 86 \, P_H$. Subsequent to this collapse, the bubble will sharply rebound, producing a cuspate pressure pulse as earlier described.

If an optimum injection is made into the original bubble as described in U.S. Pat. No. 4,735,821, then when the injected bubble establishes its maximum volume $V'_m$, the internal pressure $P_i$ will be substantially equal to $P_H$: $P_i \cong P_H$ and substantially no collapse will occur: $P_2 \cong P_H$.

Between those two limiting cases, when the bubble establishes its maximum volume $V'_m$, the internal pressure of the bubble $P_i$ will be between O and $P_H$.

B. Description of the Preferred Embodiment

The pressure peaks of the tail are emitted when the bubble has its minimum volume $V_2$ and its maximum pressure $P_2$. Therefore, the character of the tail will mainly depend upon $P_2$ and $V_2$ and consequently will be entirely determined by the values of $P_1$ and $V'_m$.

Figure 5:
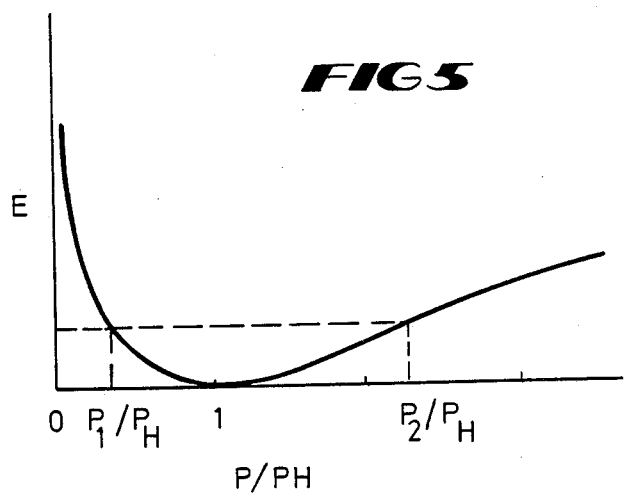
FIG. 5 is a diagram illustrating the potential energy path of a system oscillating between maximum and minimum pressure values.

It has been discovered that when the total energy $E_o$ of the system (gas and water) is given, the internal pressure $P_i$ of the bubble will oscillate (in the absence of friction) between the values $P_1$ and $P_2$, while the potential energy $E_p$ of the system will follow the curve illustrated in FIG. 5. Referring to FIG. 5, the values $P_1/P_H$ and $P_2/P_H$ are given by the intersections of the curve with the horizontal line $E_p = E_o$. For a given maximum value $V'_m$, if $P_1 = P_H$, then the potential energy of the system $E_p$ is zero and the corresponding conjugate value of $P_2 = P_H$. According to the methodology of ideal suppression, the bubble is stabilized.

When $P_1$ decreases from a value $P_1 = P_H$, then the corresponding value of $P_2$ increases beyond $P_H$. As can be seen by reference to FIG. 5, if $P_1$ is established close enough to $P_H$, or the ratio $P_1/P_H$ established near 1, then $P_2/P_H$ is also close to 1 and symmetrical to the value represented by the ratio $P_1/P_H$.

This is the case of small oscillations of the bubble around its equilibrium position. As seen by reference to FIG. 5, the ratio $P_2/P_H$ increases more quickly than the decrease in the ratio $P_1/P_H$. It has been discovered that the tail of the radiated signature maintains its quasi-harmonic character if the ratio $P_1/P_H$ stays within the range of about $k-1$ and 1, where k is the ratio of specific heats of the injected gas. For air $k = 1.40$. However, when the ratio $P_1/P_H$ decreases further to values between about $k-1$ and 0, then the tail of the signature evolves toward the cuspate and asymmetrical shape characteristic of the signature tail of a single air gun absent injection.

It has been discovered that in order to totally suppress the oscillation of a bubble created by the explosive release of a charge of highly pressurized gas having an energy $E_a$, the injected gas must have an energy at least equal to about $$\frac{E_a}{k-1}$$

Given such an injection, when the bubble reaches it new maximum volume $V'_m$, the internal pressure equals the hydrostatic pressure $P_H$. To establish hydrostatic pressure within a bubble using approximately the minimum energy $E_a/k-1$, the injection should occur when the bubble is about at its maximum volume $V_m$. As disclosed in the '821 patent, the duration of the injection should not exceed $0.2T$, where T is the period of the bubble. Therefore, if it is desired to establish $(k-1) P_H$ instead of $P_H$ within the bubble, then the required energy will be about $$(k-1)\frac{E_a}{k-1} = E_a.$$

In such a case, the injection should take place when the bubble is about at its maximum volume $V_m$. It has been further discovered that when the injected energy $E_b$ has a value of about $E_b = E_a$, then the ratio $P_1/P_H$ is equal to about $k-1$ and the bubble to primary ratio $P_2/P_0$ is between 20% and 30%.

Figure 6A:
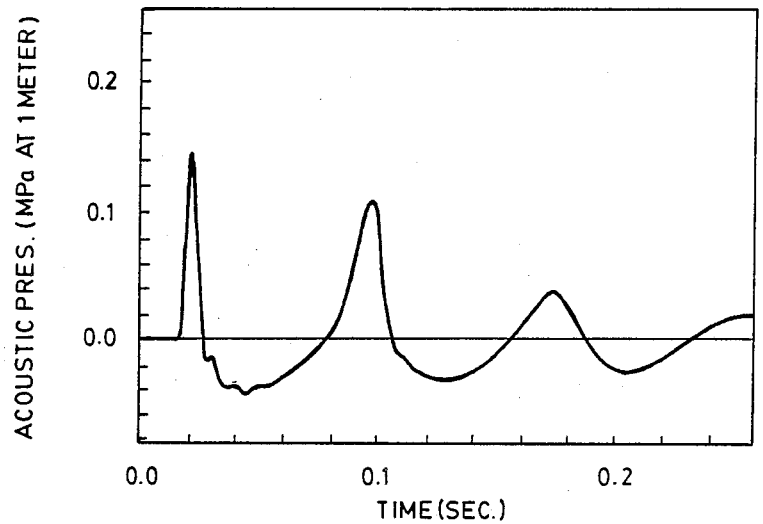
FIG. 6A is an illustration of the pulsating, asymmetrical tail characteristic of an air gun signature.

When a charge of a highly pressurized gas having an energy $E_a$ is explosively released within a body of water, it produces a primary pressure pulse having an amplitude $P_0$ and a bubble that will oscillate at a period T and produce a pulsating, cuspate asymmetrical tail having a maximum amplitude $P_2$. This oscillation is illustrated at FIG. 6A. The ratio $P_2/P_0$ or bubble-to-primary ratio is commonly used to measure the quality of a signal, though this ratio does not account for the shape or character of the signal. As earlier noted, however, the shape or character of a signal is of prime importance for the use in combination with other signals, and in the processing of the signal.

Figure 6B:
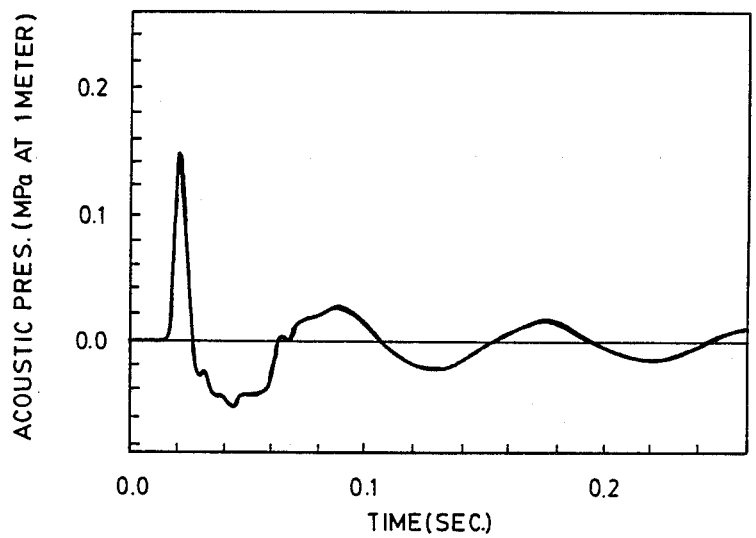
FIG. 6B is an illustration of the quasi-harmonic tail created as the result of a partial or detuned injection within the bubble.
Figure 6C:
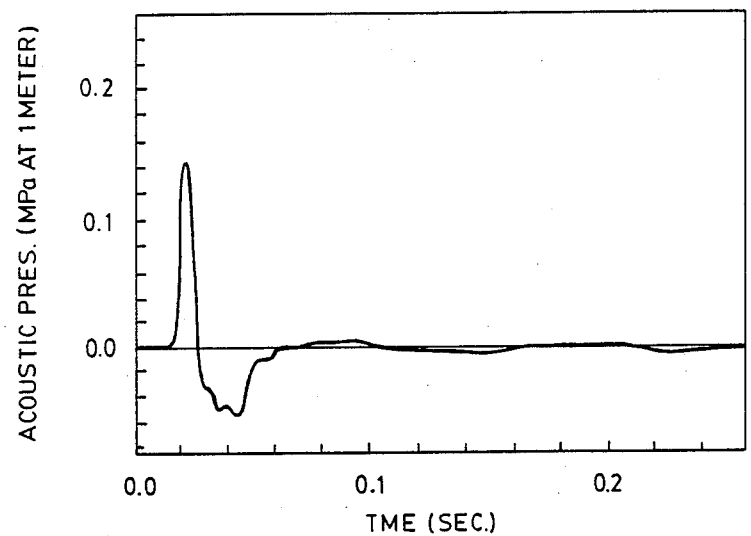
FIG. 6C is an illustration of an oscillating tail which has been suppressed in accordance with the teachings of U.S. Pat. No. 4,735,821.

U.S. Pat. No. 4,735,821 discloses the optimum conditions for bubble suppression leading to a $P_2/P_0$ ratio of about 5%, with a resultant smooth, flat tail. This optimum suppression yields a signature as illustrated at FIG. 6C. Between the situation of a non-suppressed bubble and the situation of a bubble suppressed in accordance with techniques for bubble suppression, a non-optimally tuned injection can be made to produce a quasi-harmonic oscillating tail as illustrated in FIG. 6B. This is accomplished by detuning the injection of gas into the bubble.

Methods for detuning so as to result in a quasi-harmonic tail can be achieved by nonoptimizing at least one of the three basic parameters of the injection:

1. The ratio of the injected energy $E_b$ to the original released energy $E_a$, $(E_b/E_a)$.
2. The ratio of the time the injection starts $t_1$, to the period of the bubble T, $(t_1/T)$.
3. The ratio of the duration of the injection $\Delta t/T$.

Figure 7:
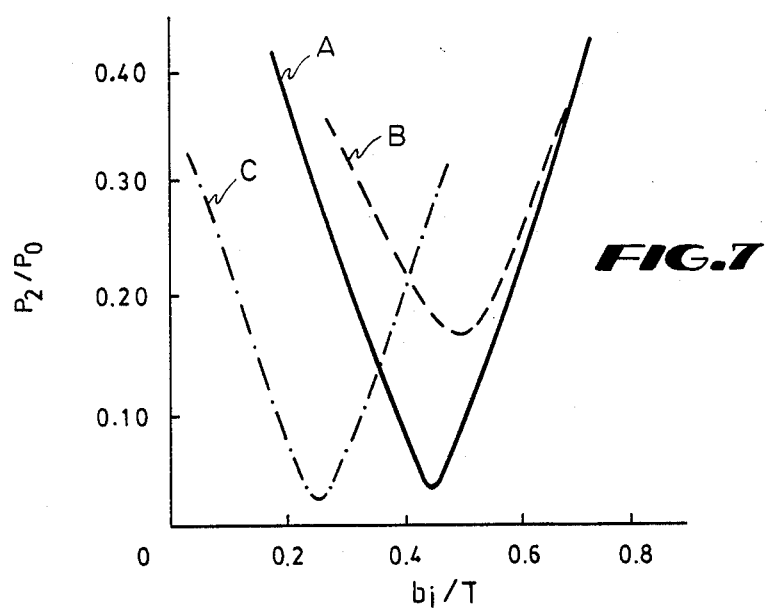
FIG. 7 is an illustration of the $P_2/P_0$ ratio brought about as the result of the nonoptimization of at least one of the three basic operating parameters of the injection of air into a bubble.
Figure 3A:
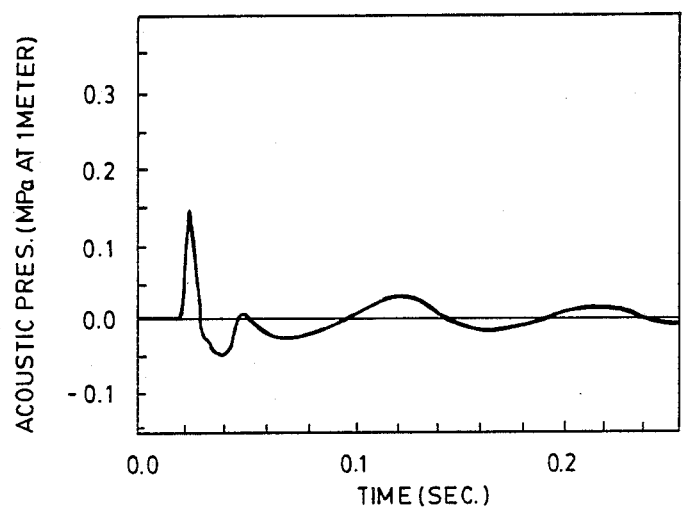
Figure 3B:
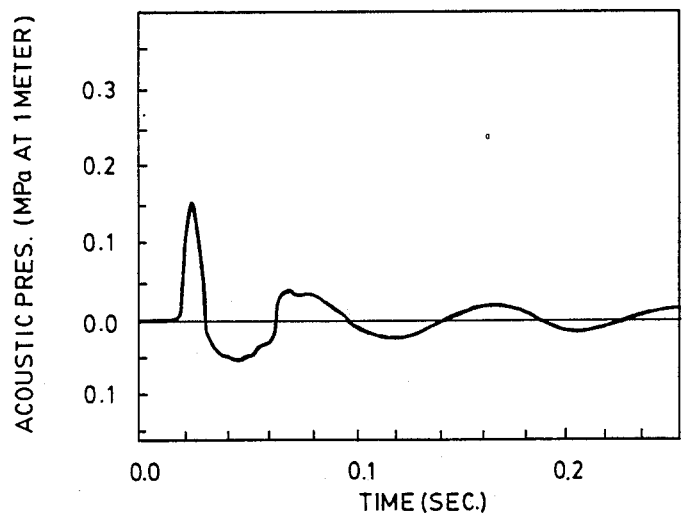

When the energy ratio $E_b/E_a$ is approximately equal to or larger than its minimum value $$\frac{1}{k-1}$$

then the two other parameters $t_1/T$ and $\Delta_t/T$ can be selected so as to minimize the ratio $P_2/P_H$ to a value 5%. When the ratio $E_b/E_a$ is maintained around the minimum value $$\frac{1}{k-1},$$

and the ratio $\Delta t/T$ is established at a corresponding optimum value (for instance at less than 0.2), but $t_1/T$, the time the injection starts is changed, the ratio $P_2/P_0$ follows a curve whose general shape is illustrated in FIG. 7.

Referring to FIG. 7, if the ratio $E_b/E_a$ decreases below the minimum value, the corresponding curve holds the same shape but the ordinate of the vertex, or the minimum value of the ratio $P_2/P_0$, will increase. In FIG. 7, curve A corresponds to an energy ratio $E_b/E_a$ around the minimum value $$\frac{1}{k-1}$$

while curve B corresponds to an energy ratio below the minimum value. It has been discovered that the tail holds a quasi-harmonic shape if the ratio $P_2/P_0$ remains below or about 30%.

When the energy ratio has a value around the minimum value, as it is the case for curve A of FIG. 7, then it has been found that the ratio $t_1/T$ is allowed to vary from about 0.20 to about 0.65 and the ratio $P_2/P_0$ will maintain a value below 30%. Maintaining these values, the tail will establish a quasi-harmonic shape.

As earlier noted, the ratio $P_2/P_0$ has a minimum value below or about 30% when the injected energy $E_b$ is approximately equal to the initial energy $E_a$, or the energy ratio $E_b/E_a$ is approximately equal to one: $E_b/E_a \cong 1$. When the energy ratio $E_b/E_a$ is increased above the minimum value $$\frac{1}{k-1},$$

and the duration of the injection $\Delta t/T$ is tuned accordingly, then the variations of $P_2/P_0$ will follow a curve similar to curve A represented in FIG. 7, but are shifted toward smaller values of $t_1/T$ as illustrated by curve C of FIG. 7. It has been found that the tail keeps a quasi-harmonic shape when $t_1$ has a value such that $t_m - 0.2T \leq t_1 \leq t_m + 0.2T$. (FIG. 7C).

If the injected energy is less than or equal to the minimum energy, and if the duration of the injection is short as compared to the period T, (ideally instantaneous) the optimum time t when the injection starts is substantially equal to half the period T:

$$t_m \cong \frac{T}{2}$$

If the injected energy is larger than the minimum value, and/or the duration of the injection is longer than its optimum value, the time $t_m$ yielding the minimum ratio $P_2/P_0$ is shifted toward values less than $T/2$ as illustrated in FIG. 7.

C. Phase Shift and Phase Inversion

It has been discovered that when two injections are begun at two different times $t_1$ and $t_2$ in a symmetrical fashion about the optimum time $t_m$, such that $t_1+t_2=2t_m,$ then the two oscillating tails have the same period and amplitude while their phases are shifted in opposite directions. In such a case, one wavelet is delayed and the other wavelet is advanced. Therefore, the sum of the two wavelets will have a lower amplitude than twice the amplitude of each individual wavelet, resulting in a reduction of the tail by destructive interference. It has been further discovered that when the energy ratio $E_b/E_a$ has a value about the minimum value $$\frac{1}{k-1},$$

then the two wavelets $t_1$ and $t_2$ have opposite phases when $t_1+t_2=2t_m,$ and then cancel each other out when superimposed. This effect may be seen by examples 2 and 3.

EXAMPLE 2

A first charge of highly pressurized gas having an energy $E_a$ is released underwater. A second charge of gas having an energy $E_b$ is injected within the bubble created by the first charge. Where $E_a$ and $E_b$ have the following values:

$E_a$ volume $V_a=45$ in$^3$; Pressure $P_a=2000$ psi,
$E_b$ volume $V_b=105$ in$^3$; Pressure $P_b=2000$ psi,
so that $E_b/E_a=2.33$
and the release depth is D=20 ft, the period of the bubble will be
T=63 milliseconds
When the injection starts at about $$t_m = \frac{T}{2} = 31.5 \text{ msec.}$$

and the duration of the injection is less than 0.2T=12.6 msec, the bubble-to-primary ratio $P_2/P_0$ is at a minimum and equal to 4%.

EXAMPLE 3

A first charge of highly pressurized gas having an energy of $E_a$ is released underwater. A series of successive injections are made inside the bubble. The injections are successively begun at
$t_1=23$ msec
and at
$t_2=40$ msec
such that
$t_1+t_2=2t_m$
Times $t_1$ and $t_2$ are symmetrical relative to $t_m$. This results in the production of two pressure pulses by the two different injections. These pulses are illustrated in FIG. 8A and 8B.

Figure 8C:
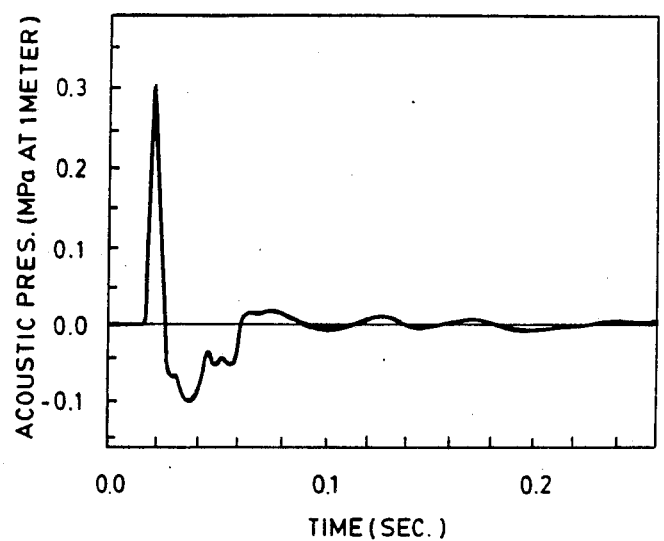
FIG. 8C illustrates the waveform formed as a result of constructive interference between the wave illustrated in FIGS. 8A-B.

It can be seen in FIG. 8 that the two oscillating tails have the same period and substantially the same amplitude but have opposite phases. This unexpected phenomenon is of prime importance for further reduction of any residual oscillations or any residual "bump", as can be seen by reference to FIG. 8C, in that by synchronizing the releases of two identical charges of gas and injection of identical gas charges within their respective bubbles, where these injections occur at two symmetrical times $t_1$ and $t_2$ such that $t_1+t_2=2t_m,$ the primary pulses are added while the respective oscillating tails substantially cancel each other out by destructive interference. In such a case, the resulting $P_2/P_0$ ratio is about 5%. This is compared to the original $P_2/P_0$ ratios which were 18% and 22%, respectively.

More than two wavelets can be used with different timing for their injection so that further reduction of the amplitude of the tail can be achieved. By synchronizing the release of at least two identical charges within a body of water and by injecting an identical charge of gas within each bubble, where each bubble undergoes a differently timed injection at different times, the bubble-to-primary ratio of the resulting wavelet may be reduced. More specifically, several pairs of symmetrically detuned injections can be superimposed to reduce the resulting bubble-to-primary ratio to a selected value.

In contrast with techniques used in air gun arrays where the resulting pulse is built from the superimposition of different pulses having different periods, the methodology of the present invention utilizes different oscillating tails which may have the same period but are dephased by use of differing times of injection. The above method offers an important practical consideration since in the utilization of an air gun array one is obliged to use different volumes of guns and/or different depths. At least 5 to 6 different volumes are necessary if a $P_2/P_0$ ratio about 15% is to be achieved. If a $P_2/P_0$ ratio of about 5% is to be achieved, at least about 16 different volumes are required. In accordance with the present invention, only two identical sources are needed to reduce the bubble-to-primary ratio to 5%.

The present method offers further practical advantages. If during operation one or more seismic device begins to shift away from the set value of an established tail characteristic, then another device in the array can be readjusted to offset the effect of this drift. Such a readjustment chiefly consists of a readjustment of the time of injection. Such readjustment can be conducted on a shot-by-shot basis without the need to suspend the operation of the device itself as is commonly necessary in the case of an air gun array.

The above examples are not exclusive. For example, different energies and/or different depths can be used in connection with the dephasing resulting from different injection times. An important aspect of the above technique of bubble suppression by phase inversion of two or more reshaped quasi-harmonic tails is the ability to utilize wavelets having relatively large bubble-to-primary ratios, e.g. in the order of 30%. Significantly, to produce a quasi-harmonic signature tail it is not necessary to perfectly tune each generator or injector. The critical limitation instead is that the operation of both the generator and injector be pretimed.

For purposes of the present invention, it is important to note that the energy of the injected gas can be below the minimum energy required for total suppression. As earlier discussed, an injected energy $E_b$ where:

$E_b/E_a \simeq 1$ can be used in connection with the use of two or more devices having different injection times, and a saving of about 40% on the required energy for the same useful primary pressure pulse can be achieved. It has been additionally discovered that when an energy ratio of approximately the minimum value is used, the phases of the oscillating tail describe a linear function of the time $t_1$ when the injection starts.

D. "Bump" Reduction

Any abrupt change in the pressure pulse of the near field signature will produce a "bump" on the far field signature. This is particularly the case if the injection duration is very short. The cuspate peaks of an original near field wavelet cannot be reduced to an acceptable level by interference with its own "ghost" signature.

This phenomenon may be observed in FIGS. 3'A–B. In FIG. 3'A, the near field signature exhibits a sharp increase in amplitude when the injection is made. This sharp increase, when reversed in polarity and shift (as it is the case in the reflected wave or ghost), cannot be sufficiently compensated by its counterpart in the near field signature. A "bump" is therefore produced in the far field signature. This is of importance, for example, if one wants to reduce the amplitude of the bump such as is the case when very high resolution is desired.

"Bump" reduction can be achieved by reducing the injection rate or equivalently by increasing the duration of the injection. In FIG. 3'A, the duration of the injection $\Delta t = 6$ msec, where the maximum acceptable value of $\Delta t = 14$ msec. The bump in FIG. 3'B can be reduced by increasing $\Delta t$ to 14 msec.

It has been discovered that the position of the "bump" relative to the primary pulse $P_0$, while depending on the period of the bubble T and the depth D where the first charge is released, also constitutes a linear function of the time $t_1$ when the injection starts. Therefore, when two identical primary charges are simultaneously released at the same depth, the primary pulse will add together.

When two injections do not commence simultaneously, two "bumps" will be formed at two different times and then their amplitude will not coincide. In other words, because the position of the "bump" is dependant on the time the injection commences, by firing two or more identical sources and using different injection times, the different "bumps" can be distributed in time so that they will not add constructively. More specifically, by utilization of two injection times $t_1$ and $t_2$ in symmetry about the optimum time such that $$t_1 + t_2 = 2t_m$$

the "bumps" will be shifted in the opposite direction. Since typically the width of the "bump" is approximately equal to the time shift of the ghost as compared to the original wave, or the relationship

Figure 9A:
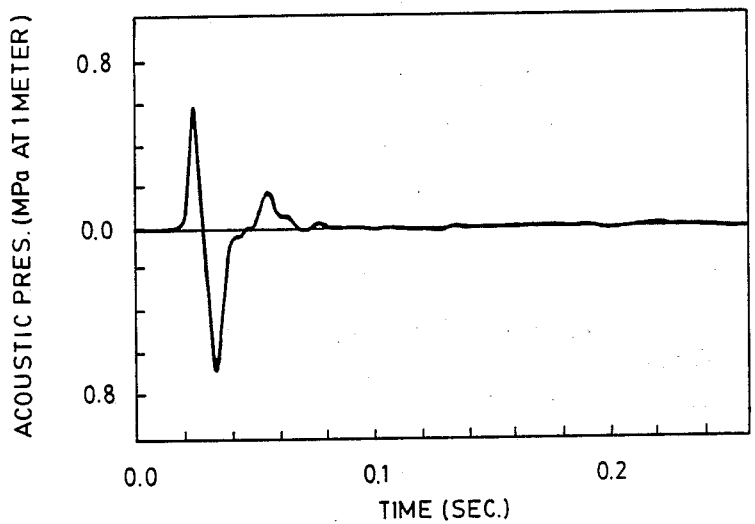
FIG. 9A illustrates a far field signature of an optimally tuned single source.
Figure 9B:
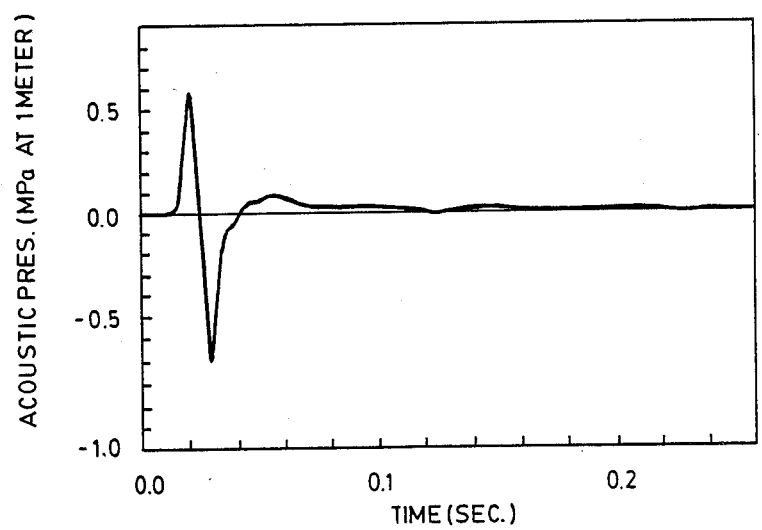
FIG. 9B illustrates the far field signature of four identical sources where the primary pulses are synchronized.

2D/C where D is the firing depth and C is the velocity of sound in water, the addition of several pairs of identical units with symmetrically opposed injection times allows for the reduction of both "bumps" and oscillation to a selected level. This technique is illustrated in FIG. 9A. FIG. 9A represents a far field signature of one gun exhibiting a "bump" of about 12%, while FIG. 9B represents the far field signature of an array of four identical guns whose injections have been symmetrically detuned so as to result in a "bump" having an amplitude of about 6%.

This particular methodology offers many practical benefits. First, the superimposition of several oscillating tails having different phases allows for a further reduction in the bubble-to-primary ratio, while also allowing for an overall enhancement of the signature. Secondly, the oscillating tail is a low frequency, monochromatic carrier, whose period can be changed from $$T\left(\frac{E_b}{E_a}\right)^{\frac{1}{2}} \text{ to } T\left(1 + \frac{E_b}{E_a}\right)^{\frac{1}{2}}$$

according to the time the injection starts. In most practical cases this is less than or equal to 10 Hz. These low frequencies are useful for deep penetration into the sub-bottom of the oceans.

When two identical spaced sources having the same phase are fired simultaneously, a maximum of the radiated energy is located in the vertical plan equally spaced from the sources. If now the two sources are slightly dephased it is known from interference theory that the maximum of the energy radiated is radiated at a direction inclined to the vertical giving a "beam steering" effect. Additionally, dephasing, (e.g. the inversion of the phase) can be easily realized on a shot-to-shot basis so as to provide a specific character to each shot, while the primary pulse can remain the same and be used as reference.

What is claimed is:

1. A method of reshaping a cuspate waveform ordinarily characteristic od secondary pulses resultant from an explosive underwater release of a first charge of highly pressurized gas having an energy $E_a$ where said first charge produces in said water a primary pressure pulse and a very low pressure region tending to oscillate at a period T, said method comprising the steps of:
   injecting within said low pressure region a second charge of pressurized gas having an energy $E_b$, where $E_b$ is at least equal to about $E_a$; and
   tuning the duration of the injection and the time the injection starts so as to produce a secondary pulse having a quasi-harmonic waveform.

2. The method of claim 1 wherein the ratio of the energy of the injected charge $E_b$ to the energy of the initial charge $E_a$ is maintained at approximately the value $1/k - 1$, where k is equal to the ratio of the specified heats of the injected gas.

3. The method of claim 1 wherein the ratio of a minimum pressure $P_1$ of the bubble resultant from the explosive release of the first charge and the second charge to the hydrostatic pressure $P_H$ is maintained in a relationship such that $k - 1 < P_1/P_H < 1$ where k equals the ratio of the specific heats of the injected gas.

4. The method of claim 1 where the ratio of the secondary acoustic pressure pulse $P_2$ to the primary acoustic pressure pulse $P_o$ is maintained at $\leq 30\%$.

5. The method of claim 1 wherein the ratio of the time the injection starts to the period T of the bubble resultant from the first charge is maintained between 0.20 and 0.65.

6. A method for reshaping a cuspate waveform characteristic of secondary pressure pulses resultant from an explosive underwater release of a first charge of highly pressurized gas, where said first charge produces in said water a primary pressure pulse and a very low pressure region tending to oscillate and to generate said secondary pressure pulses, the method comprising:
   injecting a second charge of pressurized gas into the low pressure region at a selected time, where said second charge has an energy insufficient to establish hydrostatic pressure within the low pressure region but sufficient to produce a secondary pressure pulse exhibiting a quasi-harmonic waveform.

7. The method of claim 6 wherein the ratio of the minimum pressure $P_1$ of the bubble resultant from the first and second charge to hydrostatic pressure is maintained between $k-1$ and 1, where k equals the ratio of the specific heats of the gas.

8. A method for achieving a reduced, far-field amplitude $P_2$ of a secondary pressure pulse resultant from an explosive release of a first charge of a highly pressurized gas within a body of water having a free surface where said first charge produces a powerful primary pressure pulse $P_0$ and a very low pressure region tending to oscillate and to generate said secondary pressure pulse, the method comprising:
  injecting a second charge of pressurized gas into said low pressure region, said second charge being insufficient to establish hydrostatic pressure within said low pressure region, but sufficient to produce a secondary pulse exhibiting a quasi-harmonic waveform; and
  tuning a depth where said first charge is released to achieve a selected $P_2/P_0$ ratio.

9. A method for reducing the amplitude of the secondary pressure pulses derived from the underwater explosive release of a first charge of pressurized gas, said method comprising:

injecting a second charge of gas into the bubble created by the release of the first charge, said second charge having a sufficient energy to form a secondary pulse describing a quasi-harmonic waveform; and
  superimposing a second oscillation having a reciprocal amplitude and period where said oscillation is created by an identical charge of gas having an offset time of injection.

10. A method for generating within a body of water a powerful primary pressure pulse having an amplitude $P_0$ and a secondary pressure pulse having a reduced amplitude $P_2$, said method comprising:
  simultaneously releasing within said body of water two charges of highly pressurized gas, where each of said charges produces a primary pressure pulse and a low pressure region tending to oscillate and to generate cuspate, secondary pressure pulses;
  injecting into said regions two charges of pressurized gas, said charge having sufficient energy to form two secondary pressure pulses describing two quasi-harmonic oscillations; and
  tuning the times when the injections begin to produce destructive interference between the two said quasi-harmonic oscillations and a final, secondary pressure pulse achieving a selected $P_2/P_0$ ratio.

* * * * *

UNITED STATES PATENT AND TRADEMARK OFFICE
CERTIFICATE OF CORRECTION

PATENT NO. : 4,976,333
DATED : December 11, 1990
INVENTOR(S) : Pascouet

It is certified that error appears in the above-identified patent and that said Letters Patent is hereby corrected as shown below:

Col. 1, lines 11-12, after the word "of", please delete "patent application".

Col. 3, line 41, please delete the comma between the word "peaks" and numeral "2".

Col. 8, line 1, please insert --$\leq$-- before "5%."

Col. 12, line 27, claim 1, please delete "od" and insert --of--.

Signed and Sealed this

Sixteenth Day of February, 1993

*Attest:*

STEPHEN G. KUNIN

*Attesting Officer*   *Acting Commissioner of Patents and Trademarks*